United States Patent [19]
Witt, III

[11] Patent Number: 5,413,483
[45] Date of Patent: May 9, 1995

[54] NIGHT VISION GOGGLE SIMULATOR

[75] Inventor: Frank A. Witt, III, West Columbia, S.C.

[73] Assignee: Instrument Flight Research, Inc., Cayce, S.C.

[21] Appl. No.: 246,580

[22] Filed: May 20, 1994

Related U.S. Application Data

[63] Continuation of Ser. No. 912,868, Jul. 13, 1992, abandoned.

[51] Int. Cl.$^6$ .............................................. F41A 33/00
[52] U.S. Cl. ........................................ 434/11; 359/40; 359/83
[58] Field of Search ........................ 434/11, 14, 16, 25, 434/26, 81; 359/40, 83, 72; 340/705

[56] References Cited

U.S. PATENT DOCUMENTS

| | | | |
|---|---|---|---|
| 4,423,927 | 1/1984 | Bly | 359/72 X |
| 4,652,739 | 3/1987 | Sciamanda et al. | 250/213 R |
| 4,679,910 | 7/1987 | Efron et al. | 359/72 X |
| 5,081,542 | 1/1992 | Efron et al. | 359/41 |

*Primary Examiner*—Gene Mancene
*Assistant Examiner*—Jeffrey A. Smith
*Attorney, Agent, or Firm*—McAndrews, Held & Malloy, Ltd.

[57] ABSTRACT

An imaging apparatus for permitting night vision training by simulating night vision viewing during daylight operation. A cylindrical imaging device includes an objective lens and an ocular lens. Light from the objective lens passes through a filter and is inverter by a fiber optic inverter. A pair of liquid crystals receive the inverted image and pass the same to the ocular lens for viewing by the user. A plurality of lamps are positioned for impinging light on the second liquid crystal under electronic control. The pair of liquid crystals are controlled electronically for simulating night vision photomultiplier viewing. A pair of such imaging tubes are mounted in a training helmet together with under-goggle viewing areas and peripheral viewing areas in which liquid crystals are separately placed and are separately controllable in accordance with sensed light levels. An instructor pilot uses a microprocessor based controller for controlling each of the six liquid crystals.

19 Claims, 2 Drawing Sheets

NIGHT VISION GOGGLE SIMULATOR

This is a continuation of application Ser. No. 07/912,868 filed Jul. 13, 1992, now abandoned.

BACKGROUND OF THE INVENTION

The present invention relates to an imaging apparatus and, more particularly, relates to a night vision training device. The U.S. military has long recognized the need to train their combat personnel to be adequately prepared for battlefield situations during darkness and inclement weather situations, even though there is a very apparent risk involved in such training. While these situations are two of the most demanding, they may also be used as assets by taking advantage of the enemy's reduced visibility. Low-level and nap-of-the-earth (NOE) flights have become essential in further reducing the risk of detection by modern enemy radar and electronic devices. This increased risk of low-level, NOE flights is necessary to decrease the higher risk of enemy radar and weapons.

One product of advanced technology which provides the capability to train and conduct missions in these high-risk environments is the Aviator's Night Vision Imaging System, ANVIS (ANVS-6), also known as night-vision goggles (NVG's). To attain the goal of combat-ready aircrews, training must be realistic. However, current training using such night vision devices must be conducted at night, free from ambient ground light. This may necessitating flying several hours to reach training areas, which is costly in terms of training time, fuel, and added risk of adverse weather en route. The lack of peripheral vision of both the training pilot and the instructor pilot increases the danger factor of collision with other aircraft and/or terrain.

The ability to realistically duplicate the training normally done at night, but to do it during the day, would provide a tremendous safety advantage in that the instructor pilot would not have to wear night vision goggles that normally restricts peripheral vision. Training could also be done under more favorable and less costly environments. Some emergency procedures which are not currently practiced during NVG training (e.g., search and rescue over water) could also be included with the simulated training.

Night Vision devices would not be restricted to training of aircraft crews, but would also be an important training vehicle for ground soldiers, tank operators, military personnel using night scopes, SWAT teams, rescue teams, etc.

It is therefore an object of the present invention to provide night vision simulating training goggles for use in daytime training.

SUMMARY OF THE INVENTION

This and other objects of the present invention are achieved in an imaging apparatus which simulates viewing as through night vision goggles and, more particularly, relates to a training device making use of such an apparatus.

The imaging apparatus typically has an eye piece lens, a lens system, and an objective lens. A filter is used to narrow the frequency band of the light to a pre-determined requirement. Also, the filter blocks UV and IR frequencies. The light then passes through a scattering liquid crystal providing either a clear passage of light or some appropriate level of light for demonstrating scintillation effect. A series of sub-miniature lamps are activated at various levels when required to demonstrate low to no visible light levels. The voltage to the scattering liquid crystal is controlled in accordance with the lower visibility selected. An eye piece or exit lens is used generally for focusing of light to the eye. This lens assembly maintains a correct focal length from the scattering liquid crystal to provide maximum visibility to the viewer to demonstrate a scintillation effect. This scintillating effect is believed to be created by an internal molecule vortex activity in the liquid of the crystal, providing the viewer with comparable images provided by a photo-multiplier tube, and particularly demonstrating effectively the lower light levels.

DETAILED DESCRIPTION OF THE PREFERRED EMBODIMENT

Figure 1:
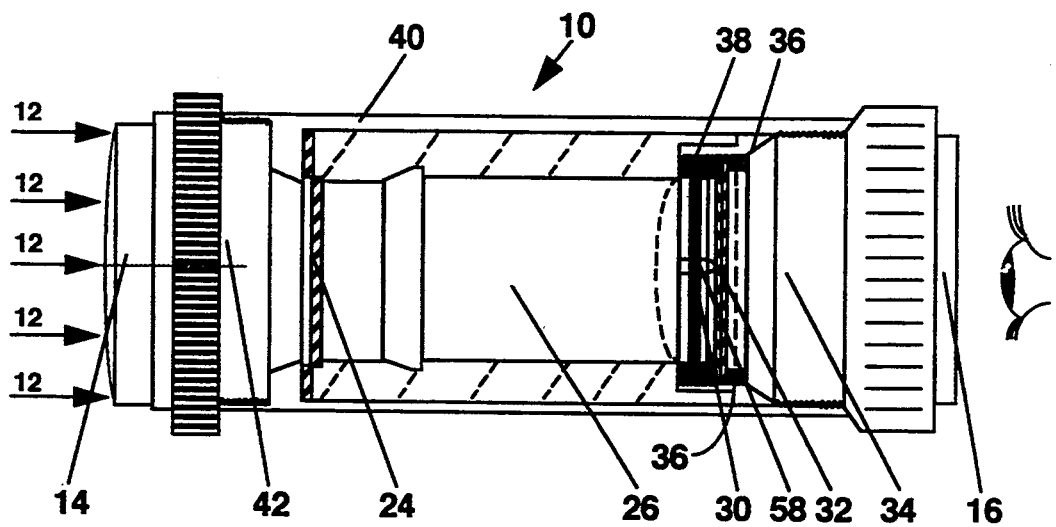
FIG. 1 is a cross-sectional side view of a light imaging apparatus embodiment.

Referring to FIG. 1, an imaging apparatus 10 receives either ambient or artificial light 12 solely at its distal end 14. The apparatus 10 includes a generally cylindrical housing 40 which seals out light from entering the apparatus, except at its distal end 14.

Light passes through imaging apparatus 10 and exits at its proximate end or viewing end 16 to the eye of the user. The light 12 is initially focused by an objective lens system 42 which is fixed at the distal end 14 of housing 40. Objective lens system 42 is conventional being adjustable with respect to distance viewing.

From the objective lens system 42, light is transmitted through a narrow band filter 24 which narrows the frequency band of light passing through the filter. Preferably, since most photomultipliers project to the eye in the green frequency, the frequency band used in filter 24 is in the green area. The filter is wider than a notch-type frequency filter and generally is a bell-shaped curve over approximately 100 nanometers in width. The bell may be peaked at approximately 565 nanometers.

The filter 24 is optically sealed to a fiber optic inverter 26 which inverts the light image passing though filter 24. As will suggest itself, inverter 26 may be formed from other structures including prisms, lens tubes, etc.

After the image is inverted, the light passes through a variable density liquid crystal 30 which is changeable in ocular density. The density is changeable from 50% transmission to about an ocular density of 4. Liquid crystal 30 is held in a fixed position in housing 40 and is electronically controllable to lower or raise its light transmission characteristics. This controls the viewing to simulate starlight or overcast, to full moon operation.

Liquid crystal 30 has polarizers (not shown) on each side of crystal 30. The polarizers sit at 90 degrees to one another so that no light will pass through crystal 30 when there is no voltage impressed across the crystal. As the voltage amplitude of the oscillating signal impressed across liquid crystal 30 increases, the liquid crystal 30 becomes more "clear" i.e. more light transmissive.

The light passes from liquid crystal 30 to a dynamic scattering liquid crystal 32. Liquid crystal 32 is totally "clear" i.e., fully light transmissive at rest without any voltage impressed across crystal 32. Increasing the amplitude of the oscillating voltage across liquid crystal 32 increases the scattering and thus increases the non-transmissivity of the crystal.

A plurality of subminiature lamps 58 are fixed into housing 40. The lamps 58 face the liquid crystal 32 and are activated at various levels of light brightness for demonstrating low to no visible light levels. Preferably, there are four lamps 58 spaced equidistantly around the perimeter of liquid crystal 32. Lamps 58 are outside of the line of sight of the user and are disposed to shine on the edge of liquid crystal 32.

The voltages sent to liquid crystals 30, 32 are controlled to accomplish a scintillation effect. As voltage decreases in amplitude on liquid crystal 30, less light is transmitted through the crystal. In order to simulate photomultiplier tube operation, as less light is transmitted by crystal 30 more scattering by crystal 32 is desired. Eventually though, liquid crystal 30 becomes dark with no transmissivity. At this point of darkness, or, if desired, sooner in the light transmission decreasing process of crystal 30, lamps 58 turn ON. Their brightness may be varied increasing up to full brightness at the point of complete darkness of crystal 30. In a photomultiplier tube, as the images grow darker, the images also becomes more hazy and harder to see. Lamps 58 serve to enable the viewer to see full scattering.

When liquid crystal 30 is turned OFF, no light passes through the crystal 30. With liquid crystal 30 turned OFF, liquid crystal 32 is turned ON to a full scattering to provide a liquid clear state. In this state, the user views the liquid in the liquid crystal 32 and sees what is believed to be the results from the liquid molecule activity in the crystal, what is called herein, scintillating activity or scintillation activity.

An eyepiece or ocular assembly 34 is spaced a specific distance from liquid crystal 32 by rigid bumpers 36. Spring assemblies 38 permit the adjustment of eye piece assembly 34 allowing assembly 34 to be moved in and out relative to housing 40. Spring assemblies 38 suspend the scattering liquid crystal 32 to allow for required mobility in order to keep a proper fixed focal length between liquid crystal 32 and eyepiece assembly 34.

Focusing the eye piece assembly 34 onto the scattering liquid crystal 32 is necessary to produce the scintillation effect to the eye of the user.

Figure 2:
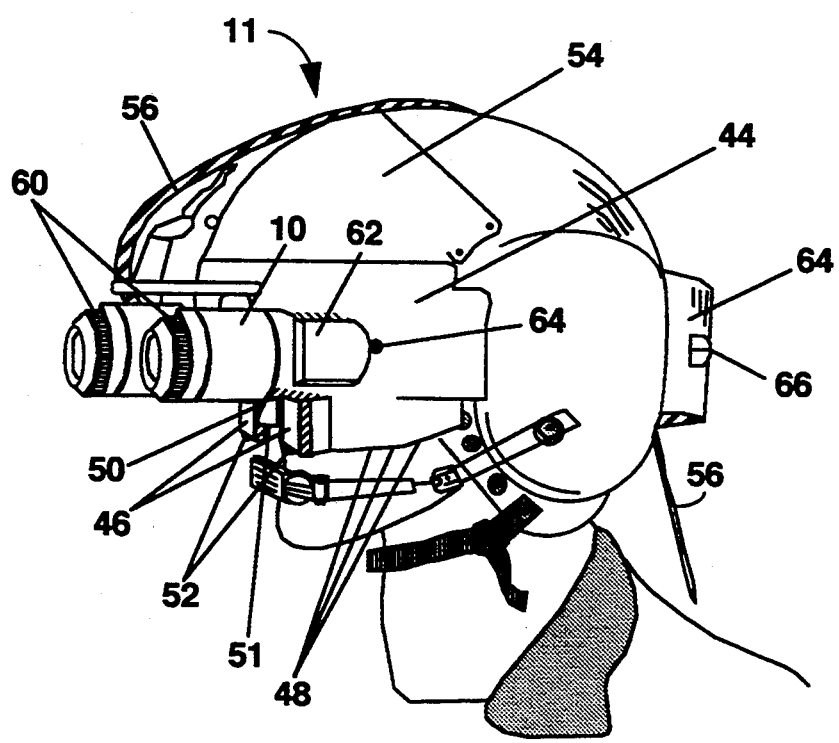
FIG. 2 is a perspective view of a training helmet incorporating the light imaging apparatus of FIG. 1.

Referring to FIG. 2, a pair of imaging apparatus 10 are mounted into a goggle or helmet apparatus 11 for wearing by a trainee or other person desiring to simulate night vision operation in the daytime. The two imaging apparatus 10 are mounted in a sealing shell 44 which may be secured to a flight helmet or other helmet device. Sealing shell 44 includes under-goggle viewing areas formed of liquid crystals 46 and peripheral viewing areas (one on each side) formed of liquid crystals 62. Each under-goggle viewing area 46 is constructed from a variable density liquid crystal electrically controllable by the instructor who generally sits near the trainee wearer of the goggle apparatus. The instructor utilizes a controller 77 (FIG. 3) to control the helmet liquid crystals.

A flexible nose piece 50 is formed on the shell 44 and will flex over the bridge of the nose 51 of the wearer.

Air vents 48 are formed in the sealing shell and allow warm air to flow upwardly and exit out of the visor cover 54. Air vents 52 are formed in the sealing shell below viewing areas 46 and allow air to pass directly over liquid crystal lenses 46 and to exit through visor cover 54.

A cable 56 carries wires from the controller 77 (FIG. 3) to the various liquid crystals 30, 32, 46, 62 and to lamps 58 and to a plurality of photocells 52, 60, 64. Peripheral viewing areas 62 are also controlled by the controller 77 in response to respective photocells 64 located at the side of each liquid crystal 62. Each photocell 64 constantly measures ambient or artificial light and feedbacks that measurement to controller 77. Likewise, areas 46 are also controlled by controller 77 in response to respective photocells 52 located under liquid crystals 62. Similarly, the liquid crystals 30, 32 are also controlled by controller 77 in response to respective photocells 60 (one for each tube 10) located at the distal ends of the tube apparatus 10. Photocells 60 are different than conventional photocells 52, 64 in that photocells 60 only "see" what the user sees, i.e., the photocells 60 have a 40 degree angle of perception or line of sight. All of the photocells are constantly sampling ambient light to provide an indication of the real light that is attempting to come through the liquid crystals. The liquid crystals are accordingly adjusted to compensate for tube changing light levels. For example, if the trainee begins on a sunny day that later becomes cloudy, the photocells cause the controller to change the liquid crystals to compensate for the change in ambient light or artificial light so sensed.

When the trainee looks toward the sun, the controller 77 causes the system to shut down. Photocell 60 on the front of the tube apparatus 10 senses this viewing into the sun.

A battery box 65 holds batteries which powers controller 77. Alternatively, the batteries may be carried in the controller 77. An ON/OFF switch 66 is housed on battery box 65. This permits the trainee himself to turn OFF the system. Switch 66 shuts OFF the power. In the preferred mode, all vision is blocked when switch 66 is turned OFF.

Figure 3:
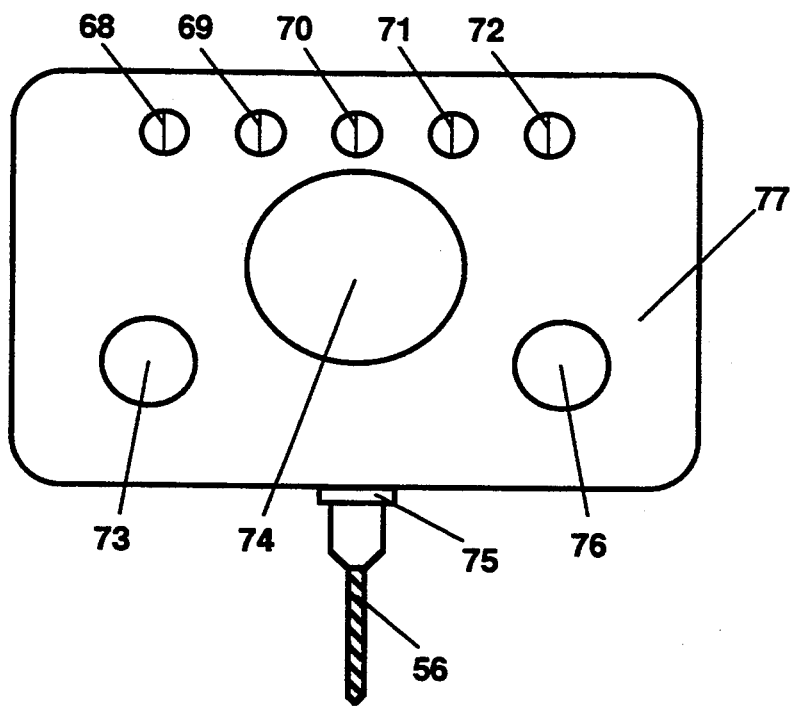
FIG. 3 is a plan view of a controller for use with the helmet of FIG. 2.

FIG. 3 is an embodiment of the controller 77. Switch 68 is an OFF/ON switch for the controller. Switch 68 gives the instructor the capability to turn OFF the system. Switch 69 is a "whiteout" switch which activates liquid crystal 32 to a scattering mode and activates lamps 58 to simulate blooming and white out conditions. Actuation of switch 69 removes power on liquid crystal 30 to block light, turns up lamps 58 fully and puts liquid crystal 32 at full voltage to scatter fully; this occurs for the first ½ second; after which the lamps 58 are turned OFF. The system goes back to preset mode when the instructor resets switch 69. Switch 70 turns off both liquid crystals 30, 32 for shutdown, by removing power to liquid crystal 30 and applying full power to liquid crystal 32. LED 71 is a battery low indicator which flashes every 5 seconds when the battery (not shown) is low. LED 72 flashes when the microprocessor needs to be reset. To reset the microprocessor, switch 68 is turned OFF and then ON. Rotary switch 73 controls under-goggle viewing crystals 46. By applying power to liquid crystals 46, the under-goggle viewing areas clear to some controlled vision. Rotary switch 73 sets cockpit visibility to simulate night time light coming from the instrument panel. The photocells 52 provide feedback of light levels for maintaining that controlled vision. Rotary switch 74 controls the total visibility through the goggles with multiple position selection. For example, the selection may be in terms of percentage of moon light, i.e., full moon, 70% moonlight, 25% moonlight, 10% moonlight, starlight, full moon overcast, starlight overcast. As understood, these are various levels of light. Rotary switch 76 controls the visibility due to simulated failure of tubes 10, either left tube OFF, right tube OFF or both tubes OFF. The tube will fade out, i.e., gradually go to actual darkness in the way in which an actual tube normally fails. Connector 75 connects the controller 77 with battery box 65 (FIG. 2) via cable 56.

Figure 4:
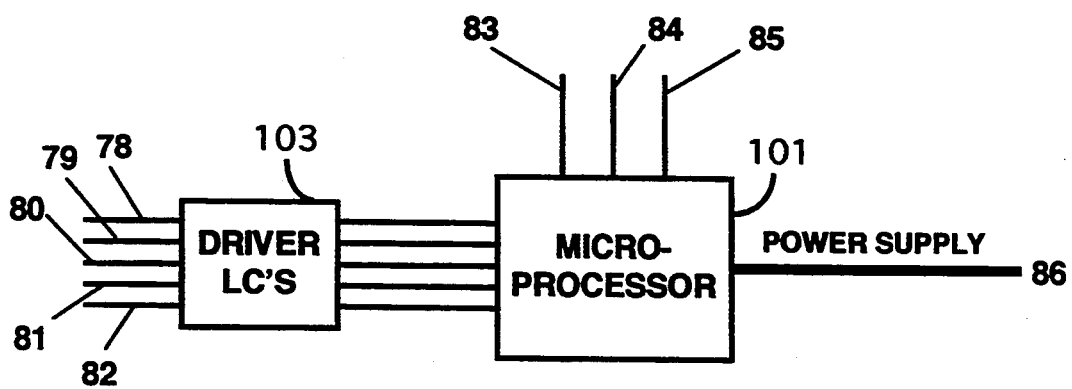
FIG. 4 is a block diagram of circuitry for use in the controller of FIG. 3.

Referring to FIG. 4, microprocessor 101 acts as the central control device for controller 77. Each of the six photocells 52, 60, 64 separately return voltage indication signals along cables 83, 84, and 85. These six photocells determine the control of visibilities to maintain the values set by controller 77.

A plurality of liquid crystal drivers 103 are controlled by microprocessor 101 to establish the correct oscillating signal across the liquid crystals and the correct voltage level to lamps 58. Cable 78 carries control voltage to liquid crystal 30. Cable 79 carries control voltage to liquid crystal 32. Cable 80 carries control voltage to liquid crystal 46. Cable 81 carries control voltage to liquid crystal 62. Cable 82 carries control voltage to lamps 58.

For example, if switch 74 is set at full moonlight, microprocessor 101 varies the signals applied along cables 78 through 82 depending on the photocell signals received along cables 83, 84, 85.

What is claimed is:

1. An imaging apparatus for use during daylight training, for simulating night vision photomultiplier tube viewing, comprising:
   an objective lens;
   a filter disposed in a fixed relationship with said objective lens;
   an inverter means positioned for receiving light from said filter;
   a first liquid crystal set in a fixed relationship relative to said inverter means for receiving an inverter image from said inverter means;
   a second liquid crystal positioned for movement relative to said first liquid crystal; and
   an ocular lens assembly fixed relative to said second liquid crystal and translationally movably disposed relative to said first liquid crystal;
   said first and second liquid crystals electrically operatable for simulating the appearance of night vision photomultiplier tube operation to a user viewing through said ocular lens assembly.

2. The apparatus of claim 1, wherein said apparatus includes control means for controlling said first and said second liquid crystals to adjust a simulated low light level as viewed by the user of the apparatus.

3. The apparatus of claim 1, wherein said apparatus includes compensating means for controlling said first and second liquid crystals to maintain a constant condition of simulated low light levels as viewed by the user of the apparatus.

4. The apparatus of claim 1, wherein said first liquid crystal includes adjusting means operable to vary the transmissivity of said liquid crystal.

5. The apparatus of claim 1, wherein said second liquid crystal includes lamp means for creating a scintillation effect.

6. The apparatus of claim 1, wherein said apparatus includes control means for shutting down the apparatus when the apparatus is oriented towards the sun.

7. An imaging apparatus for simulating night vision goggle images, comprising: an objective lens,
   a filter disposed in fixed relationship with said objective lens,
   liquid crystal means movably disposed in relation to said filter means,
   an eyepiece,
      means for compensating for varying brightness levels to maintain a constant simulated low light level,
      means operably connected to said liquid crystal means for adjusting said simulated low light level to simulate various conditions of night vision goggle viewing, and
      means operably connected to said liquid crystal means for simulating a scintillation effect.

8. The apparatus at claim 7, wherein said liquid crystal means includes lamp means for simulating said scintillation effect.

9. The apparatus of claim 7, wherein said liquid crystal means comprises a first liquid crystal and a second liquid crystal disposed in moveable relation to said first liquid crystal.

10. The apparatus of claim 7, wherein said filter has a bell-shaped characteristic.

11. The apparatus of claim 10, wherein said filter has a peak in the green portion of the frequency spectrum.

12. The apparatus of claim 7, wherein said apparatus includes inverter means for inverting images.

13. The apparatus of claim 9, wherein said first liquid crystal means is polarized by two polarizer means.

14. A night vision goggle simulator, comprising:
   an objective lens,
   a filter,
   an inverter,
   liquid crystal means for simulating night vision goggle effects,
   control means operably connected to said liquid crystal means for varying said liquid crystal means to achieve different night vision goggle effects,
   compensating means operably connected to said liquid crystal means for adjusting said liquid crystal means to maintain a constant level of simulated low light level under varying brightness conditions, and
   an eyepiece.

15. The simulator of claim 14, wherein said control means is remotely located from said liquid crystal means.

16. The simulator of claim 14, wherein said liquid crystal means includes lamp means for simulating night vision goggle effects.

17. The simulator of claim 14, wherein said liquid crystal means is movably disposed relative to said eyepiece.

18. The apparatus of claim 14, wherein said simulator is mounted on a helmet.

19. The apparatus of claim 14, wherein said compensating means includes means for shutting down the apparatus when the apparatus is oriented towards the sun.

* * * * *